June 26, 1962 V. L. CARISSIMI 3,041,437
CONTROL DEVICE
Filed Dec. 14, 1956
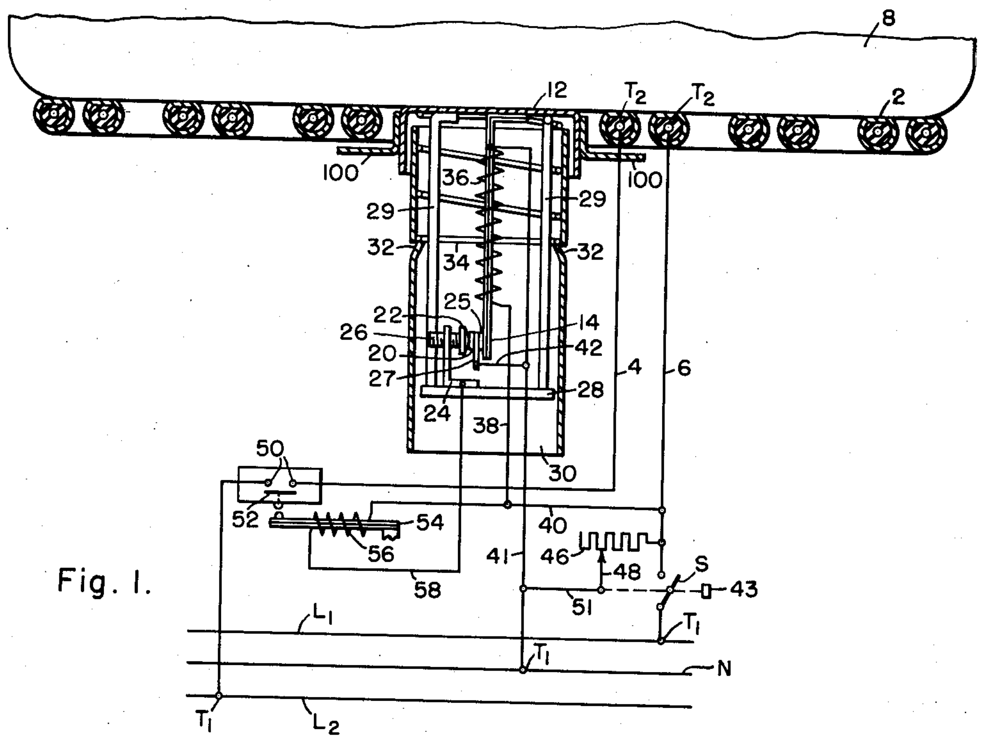
Fig. 1.
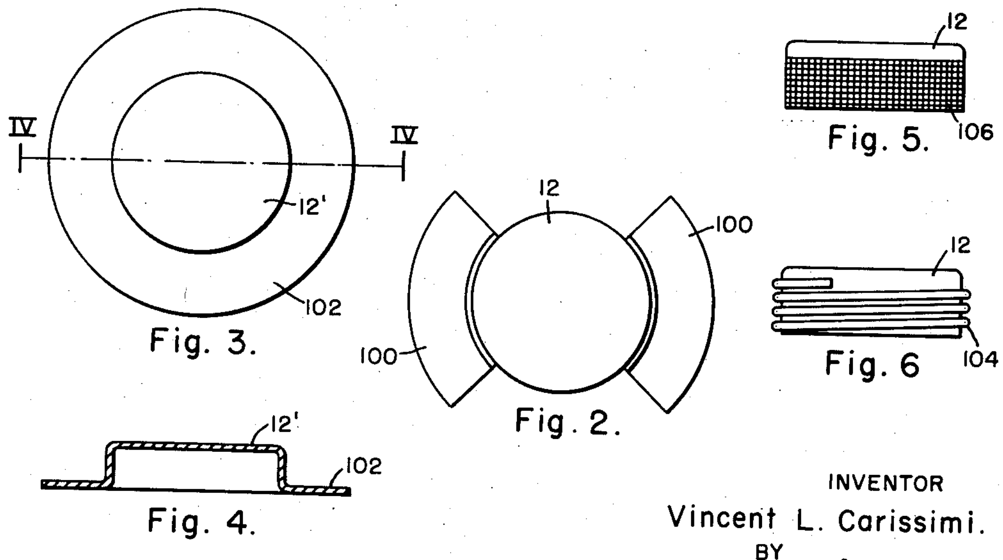
Fig. 3.
Fig. 2.
Fig. 4.
Fig. 5.
Fig. 6
INVENTOR
Vincent L. Carissimi.
BY
Arthur T. Stratton
ATTORNEY

United States Patent Office 3,041,437

Patented June 26, 1962

1

2

3,041,437

CONTROL DEVICE

Vincent L. Carissimi, Fairfield, Conn., assignor to Westinghouse Electric Corporation, East Pittsburgh, Pa., a corporation of Pennsylvania Filed Dec. 14, 1956, Ser. No. 628,423

10 Claims. (Cl. 219—20)

My invention relates to a control device, and more particularly to a device for controlling the electrical energization of an electrical heating unit during the period that a heated cooking vessel and contents are in the "boil" or constant temperature zone.

In cooking controls it is desirable to obtain a control which will permit an infinite number of vessel and vessel content temperatures to be selected and automatically maintained and which control will further provide some means of varying the energy output of heating coils so that various degrees of boiling of the contents of the vessel may be selected and automatically maintained. Heretofore the temperature at which the automatic control is responsive for operation has been predicated on the fact that the bottom of a vessel of high conductivity material is substantially the same as the temperature of the contents of the vessel and thus the vessel bottom can be used to provide the signaling temperature to a sensing device for controlling the energy output of the heating coils to maintain the selected temperature in both the vessel and its contents. In controlling the boiling activity of the vessel contents, something other than straight thermal conduction from the vessel to the sensor device must be used due to the fact that the temperature at which the contents of a vessel will boil will be constant regardless of the severity of the boil or the amount of contents of the vessel.

If full wattage is applied to the heating coils during the boiling period, the water in the vessel, which is normally used in cooking, will come to a boil. The wattage of most heating coils currently used by electrical range manufacturers is sufficient to maintain a vigorous boil in the largest of vessels that are normally employed in household kitchens. With such a high capacity heating coil any smaller quantity of liquid in a vessel comes to a still more vigorous boil. To achieve a full wattage output condition of the heating coil predicated on thermal transfer from the vessel to the sensing device, it is necessary to supply a boil setting that calls for some temperature above 212° F., in order to compensate for the variation in boiling point with changes in altitude. Inasmuch as the majority of foods are cooked with water, it will be realized that the boiling point of water will be the governing factor; accordingly, such a control system may require a temperature of 216° F. to achieve full wattage output of the heating coil under all normally encountered atmospheric conditions. Thus the 216° F. temperature would never be reached under conditions where the boiling point of water is less than 216° F. and the vessel would be continuously heated by the heating coil until the water in the vessel boiled away and the dry vessel reached the control temperature of 216° F.

At present there are automatic cooking devices currently on the market to provide boil zone control by providing a choice between full input setting as described, and one or more points at which the energy input through the heating coils is controlled by an auxiliary set of cycling contacts independent of the thermal unit. With such controls if the temperature of the vessel drops below approximately 208° F. or rises above approximately 228° F. the thermal control takes over. My invention relates to a thermal method of boil control which precludes the necessity of any auxiliary switching or cycling devices.

Accordingly, one object of my invention is to provide a new and improved device for controlling a heated vessel at a constant temperature by thermal means alone.

Another object of my invention is to provide a new, improved and simplified device for thermally controlling the output of a heating element during the period a heated vessel remains at a constant temperature.

A more particular object of my invention is to provide a new and improved device for thermally controlling the heat output of a heating element during the period a heated vessel is at a constant temperature, having auxiliary thermal responsive means located adjacent the heating element for conducting additional heat to the heating element control device.

Still another more specific object of my invention is to provide a new and improved device for thermally controlling the electrical energization of a heating element, with such device having a darker area located adjacent the heating element.

Another more specific object of my invention is to provide a new and improved device for thermally controlling the electrical energization of a heating element, with such device having a plurality of turns of high heat conductivity wire located adjacent the heating element.

These and other objects of my invention will become more apparent upon consideration of the following detailed description of preferred embodiments thereof when taken in conjunction with the attached drawings, in which:

FIGURE 1 is a cross-sectional view of a heating element having a control device constructed in accordance with the principles of my invention located therein, and illustrating the electrical control circuit therefor;

FIG. 2 is a top plan view of the sensor plate for the control unit as shown in FIG. 1;

FIG. 3 is a top plan view of another type of sensor plate for a control unit as shown in FIG. 1;

FIG. 4 is a cross-sectional view of the sensor plate shown in FIG. 3 taken substantially along the lines IV—IV thereof;

FIG. 5 is a side elevational view of another type of sensor plate for a control unit as shown in FIG. 1; and FIG. 6 is a side elevational view of another type of sensor plate for a control unit as shown in FIG. 1.

The use of electrical resistance heating elements, and particularly those for electrical ranges for which my control is ideally suited, are well known in the art and accordingly their construction and operation need not be described. Referring to FIG. 1, an electrical resistance heating element 2 is shown which has its opposite ends electrically connected by means of suitable electrical conductors 4 and 6 to suitable electrical supply conductors $L_2$ and $L_1$ respectively. As is customary, suitable terminals $T_1$ and $T_2$ may be provided for securing conductors 4 and 6 to the conductors $L_1$ and $L_2$ and to the ends of the heating element 2, respectively. As is also well known in the art, the heating element 2 may be designed to operate at various voltages. The conductors $L_1$ and $L_2$ are shown with a third grounded neutral conductor N, as is commonly employed by the industry. The voltage between the various conductors $L_1$, $L_2$ and N may vary as desired and as is common practice today.

As also shown, heating element 2 is adapted to support a cooking vessel 8 on its upper surface and is provided with a central opening in which a control unit, constructed in accordance with the principles of my invention is located. Although not shown, the heating element 2 is stationarily supported by suitable means such as the frame of an electric range in a well known manner. Further, it is to be realized that water is the common cooking fluid employed and that at standard atmospheric conditions the boiling temperature of water is 212° F. The boiling point of water varies with variations in atmospheric conditions so that it is necessary for a range manufacturer to supply a control unit which will function under all normally encountered atmospheric conditions.

As shown, the control unit comprises an inverted cup-shaped sensor plate 12, the upper surface of which is biased into engagement with the bottom of the vessel 8 as hereinafter described. The sensor plate 12 is preferably formed from a high heat conductivity, high creep strength material, such as stainless steel, which is also resistant to the corrosive effects of food spillage which may occur during the cooking process. A generally L-shaped sensor bimetal 14 is located centrally of the underside of the sensor plate 12 with the one leg thereof being secured to the undersurface of the sensor plate 12 in any suitable manner, such as by being welded or brazed thereto. Bimetal 14 may be made from any suitable pair of dissimilar materials having different coefficients of expansion as are well known in the art and is designed, as will become more apparent hereinafter, so that upon heating the free end moves in a counterclockwise direction as viewed in FIG. 1.

An insulating plate 25 of any suitable high temperature insulating material is secured in any suitable manner such as by riveting to the free end of the sensor bimetal 14. A contact 20 which is formed from any suitable arc resistant material such as silver or an alloy thereof is secured to the plate 25 in any suitable manner, such as by being riveted thereto. The contact 20 is cooperable with a contact 22 of a material similar to that of contact 20 ad which is adjustably secured to a generally L-shaped electrical conducting support 24 formed from a suitable electrical conducting material, such as an alloy of copper. In order to facilitate electrical contact to the contact 20 a terminal 27 of any suitable electrical conducting material is mounted on the plate 25 in electrical engagement with contact 20 and which extends outwardly therefrom. It will be noted that the contact 22 is provided with a threaded shank 26 which threadedly engages an opening, not shown, in one leg of the support 24 so that the position of the contact 22 with respect to the one leg of the support 24, and consequently, the other contact 20 may be varied in small increments. In order to permit the contact 22 to engage contact 20 with various contact pressures, the bimetal 14 is preferably formed from a resilient bimetal material as is well known. Although this particular simplified adjustable structure may be utilized between the support 24 and the contact 22, it is to be realized that other suitable adjustable means may be employed.

The other leg of the support 24 is rigidly secured in any suitable manner, such as by riveting, to a support 28 located below the free end of the sensor bimetal 14 which is formed of any suitable high temperature insulating material. The support 28 in turn is rigidly secured to the underside of the sensor plate 12 in any suitable manner and, as shown, a plurality of elongated upwardly extending tie rods 29 are permanently secured in any suitable manner to both the support 28 and the underside of the sensor plate 12 adjacent the fixed leg of the sensor bimetal 14. The particular manner of securing the ends of the tie rods 29 to the underside of the sensor plate 12 may be accomplished in various well known manners, such as bending the ends of the tie rods 29 transversely and soldering or brazing the transversely extending parts to the underside of the sensor plate 12.

In order to prevent the aforesaid assembly from being fouled due to spillage, a cylindrical shield 30 is provided which is rigidly secured to the aforementioned frame, not shown, to which the heating element 2 is secured and is also supported thereby. The shield 30 is preferably formed from a suitable corrosion resistant material, such as stainless steel or aluminum, and is located so as to extend around the bimetal 14 and the support 24 with its upper edge being located closely adjacent the undersurface and downwardly extending sides of the sensor plate 12, and with its lower edge being spaced below the support 24. The shield 30 is provided with integral inwardly extending supporting legs 32 for receiving the bottom coil of a biasing spring 34 on their upper edge. The spring 34 is formed of any suitable spring material which is resilient at elevated temperatures, such as stainless steel, so that it is capable of withstanding the induced thermal stresses. The upper coil of spring 34 engages the undersurface of the sensor plate 12 and extends around the tie rods 29 in order to bias the sensor plate 12 upwardly into engagement with the lower surface of the vessel 8. As can be appreciated, such positive engagement between the vessel 8 and the upper surface of the sensor plate 12 is desirable.

In order to obtain selective control of the operation of the sensor bimetal 14, a heater coil 36 of any suitable electrical resistance wire is wound about bimetal 14 in a well known manner and insulated therefrom. The heater coil 36 has one of its ends electrically connected by means of a suitable conductor 38 to another suitable electrical conductor 40 having one of its ends connected to the conductor 6. The other end of the heater coil 36 is electrically connected by a suitable electrical conductor 41 to the supply conductor N. The conductor 41 is also electrically connected to the terminal 27 by means of a suitable electrical conductor 42. Again a suitable terminal $T_1$ may be employed for connecting conductors 41 and N together.

It will be noted that the heater coil 36 is connected between the supply conductors $L_1$ and N so as to be operative regardless of the energization of the heater coil 2. In order to vary the electrical input to the heater coil 36 a resistor 46 is connected to the conductor 6 and an adjustable tap 48 is electrically connected to the conductor 41 by means of a suitable electrical conductor 51. The tap 48 adjustably engages the resistor 46 so as to provide in conjunction with the resistor 46 a variable resistor in parallel with the heater coil 36. It is also desirable that the conductor 6 be provided with an on-off switch so that the one side of the heater coil 2 may be disconnected from the line $L_1$. Accordingly, a switch S having spaced contacts in the conductor 6 is provided which is located between the resistor 46 and the line $L_1$. Switch S may be of any conventional type; however, in order to eliminate duplication of switches, switch S is preferably provided both with an "on-off" position and is of a construction so that it can be moved beyond the "on" position to obtain adjustment of the tap 48 across the resistor 46. With such a construction and by placing a suitably marked identification plate in juxtaposition with handle 43 of the switch S, the handle 43 may be moved to a given position so as to both electrically connect the heater 36 across the lines $L_1$ and N and to also move the adjustable tap 48 to the desired operating position with respect to the resistor 46.

As also shown, conductor 4 is provided with a pair of normally open spaced contacts 50, similar to contacts 20 and 22, which are adapted to be electrically bridged by means of a movable contact 52. The operation of the movable contact 52 is obtained by means of a bimetal 54 which is similar in construction to the bimetal 14 previously described and around which a heater coil 56 is disposed, similar to the heater coil 36. As shown, the one end of the heater coil 56 is electrically connected to the conductor 40 and the other end is electrically connected to the support 24 by means of a suitable electrical conductor 58. Further, the bimetal 54, as shown, is fixedly secured at one of its ends and is of a construction so that upon heating its free end engages the movable contact 52 to force the movable contact into engagement with the spaced contacts 50.

The system as shown in FIG. 1 is in the normal unheated position with switch S open and contacts 50 disconnected from each other. The contact 22 is located with respect to contact 20 so that an initial contact pressure is built up therebetween which pressure will determine the cycling point of the bimetal 14 as hereinafter described. By placing the vessel 8 upon the heating coil 2 the sensor plate 12 is depressed but does not have any effect upon the engagement of the contacts 20 and 22. By moving the handle 43 of the switch S to the closed position the heater coil 36 is directly connected across supply lines N and $L_1$ by means of the circuit comprising conductor 41, heater coil 36 and the conductors 38, 40 and 6. Such current flow will immediately cause heating of the heater coil 36. The magnitude of such current flow will be dependent, however, upon the position of the variable resistor 48—46 connected across the heater coil 36.

At the same time switch S is closed, it will be noted that the heater coil 56 is directly connected across supply lines $L_1$ and N by means of conductors 6 and 40 and conductor 58, support 24, engaged contacts 20—22, terminal 27 and conductors 42 and 41. By means of the current flow through the heater coil 56 the bimetal 54 will expand to cause its free end to engage the contact 52 and move the contact 52 into bridging relationship with the spaced contacts 50 whereby the heater coil 2 will be connected across the supply lines $L_1$ and $L_2$ by means of the circuit comprising conductor 4, having electrically bridged contacts 50 therein, and conductor 6, having the closed switch S therein. As soon as heating of the heating element 2 occurs heat will be transmitted to the vessel 8 and its contents which, in turn, will cause heat to be transmitted to the sensor plate 12 and the sensor bimetal 14 secured thereto.

Such heat flow through the vessel will tend to cause the lower end of the sensor bimetal 14 to move counterclockwise as described which will continue until the sensor bimetal 14 has received sufficient heat to overcome the contact pressure between the contacts 20 and 22 whereupon the contact 20 will move away from the contact 22. Of note, however, is the fact that as the heater coil 36 has been heated during this period and as the deflection of the heated bimetal 14 is in a direction to open the contacts 20 and 22, it is not necessary for the sensor bimetal 14 to receive all of the heat to cause separation of the contacts 20—22 from the vessel 8 alone. Upon separation of contacts 20 and 22 the heater coil 56 will be disconnected from the supply lines $L_1$ and N, so that bimetal 54 will no longer be heated and will start to lose its heat to the surrounding air. When bimetal 54 has cooled sufficiently, it will move away from the contact 52 and cause the movable contact 52 to move out of engagement with the spaced contacts 50 whereby the heater element 2 will be disconnected from the supply lines $L_1$ and $L_2$ and, in turn, will start to cool.

Cooling of the heating element 2 will cause the vessel 8 and its contents to cool and in turn the sensor bimetal 14 will be cooled. Upon cooling the sensor bimetal 14 will move clockwise to reestablish engagement of the contacts 20 and 22 by moving the contact 22 toward contact 20. It will be noted, however, that the heater coil 36 is not disconnected from the supply lines $L_1$ and N as long as the switch S remains closed so that the bimetal 14 is constantly being urged counterclockwise regardless of whether the contacts 20 and 22 are in or out of engagement with each other. Thus, the action of the heater coil 36 opposes the reengagement of the contacts 20 and 22 so that more of a heat gradient in the cooling of vessel 8 is required to obtain closing of the contacts 22 than is required in the heating of vessel 8 to obtain opening of the contacts 20 and 22. By varying the heat output of the heater coil 36 by means of the variable resistance 46—48 a range of temperature of the vessel 8 at which the contacts 20—22 will separate may be obtained.

The effect of the heater coil 36 can also be understood by considering the circuit without any heat being supplied by the heater coil 36. In such event when the sensor bimetal 14 receives sufficient heat it will move counterclockwise so as to cause separation of the contacts 20 and 22 and in turn as indicated, heating element 2 is deenergized. Upon deenergization of heater element 2 the vessel 8 is cooled and the sensor bimetal 14 is cooled and urges the contact 20 into engagement with contact 22. Thus, the device, without the heater coil 36, will have a specific cycling temperature dependent upon the characteristics of the bimetal 14 and depending upon the contact pressure between the contacts 20 and 22. It, of course, will be obvious that by increasing the contact pressure between the contacts 20 and 22 a greater force must be exerted by the sensor bimetal 14 before cycling of the device will occur.

By supplying the heating coil 36 with heat, contact 20 is urged away from contact 22 so that the sensor bimetal 14, in this case, receives additional heat so that the cycling temperature of the bimetal 14 is achieved in a shorter time interval than in the case where no heat is supplied to the bimetal 14. In view of the fact that the variable resistor 46—48 has an infinite number of positions, within limits, it can be seen that the cycling temperatures may readily be varied between a wide range of values as each setting of variable resistor 46—48 will cause a change in the current flowing through the heating coil 36 and, consequently, a change in the temperature and thus deflection of the bimetal 14.

Aside from the heating effect of the heater coil 36, the operation of the control device as heretofore described is thermally responsive to the temperature of the sensor plate 12, which in turn is responsive only to the temperature of the vessel 8 and its contents, and will obviously be insensitive to any change in demand of heat output of the heating element 2 during the period the contents of the vessel 8 are at the boiling temperature. Consequently, in order to control the heat output of the heating element 2 during a boil period I have provided auxiliary thermal pick-up means which is responsive to the heat output of the heating element 2 to cause additional heating of the bimetal 14.

Referring now to both FIGS. 1 and 2, it will be noted that an arcuately shaped projection 100 having a generally L-shaped cross section is secured to opposite sides of the sensor plate 12 so that the lower legs thereof extend outwardly from the sides of the sensor plate 12 and slightly below the inner coil of the heating element 2. It will also be noted that the upwardly extending legs of the projection 100 are located adjacent the inner coil of the heating element 2. Projections 100 may be secured to the sensor plate 12 in any suitable manner, such as by being resistance welded or brazed thereto. By providing the sensor plate 12 with the projections 100, the sensor bimetal 14 can attain a temperature higher than that of the contents of the vessel 8, particularly with reference to the period that the contents of the vessel 8 are at the boiling temperature.

Thus, should a low boil for a small amount of liquid be required, and assuming that by proper movement of the handle 43 of the switch S, the contacts 20 and 22 would be set to break their engagement at some temperature above 212° F. for example 216° F., by providing the projection 100, heat is conducted to the sensor plate 12 both by convection and radiant heat transferred to each leg of the projection 100 from the inner coils of the heating element 2 and would add an equivalent heat to the sensor plate 12 so that the resulting temperature which is effective upon the sensor plate 12 is 216° F. This latter figure would be predicated on the fact that the projections 100 by virtue of the convected and radiated heat transferred to them from the heating coil 2, would add an equivalent heat to the sensor plate 12 so that the resulting sensed temperature is 216° F. The contacts 20—22 would then break and energy flow to the heater coil 2 would be disrupted. When the temperature of the sensor plate 12 dropped below 216° F. due to heat loss from the projections 100, and due to thermal transfer from the sensor plate 12 to the vessel 8, the contacts 20—22 would close and the cycle would begin again. Depending on vessel 8 and its contents, a cycle would be established of "off" and "on" times and a resulting percentage input that would continue to repeat. It is to be realized that the legs of projections 100 located below the heating element 2 pick up the majority of such heat due to the fact that there is little difference thermally between the other legs of the projections 100 and the sides of sensor plate 12 to which they are attached. Further, most of such heat pick-up is received from the inner coil of the heater element 2.

For a low boil in a large amount of liquid, the setting would be that equivalent to, for example 220° F. Thus, the duration of time for the projection 100 to pick up and conduct the additional 8° F. above 212° F. to the sensor plate 12 would be longer and the percent input of electrical energy to the heating element 2 would be higher than in the previously described low-boil low amount setting. The percent input is inversely proportional to the "off" time which would be shorter since heat would actually be lost to the vessel 8 from the sensor plate 12 at a faster rate because of the greater differential in temperature (between 220° F. to 212° F.) than in the lower setting (between 216° F. and 212° F.).

For a high boil in a large amount of liquid which would require a higher percent input, but still not 100% input, a setting of, for example 226° F., would be selected. Again, this would result in still longer "on" periods and shorter "off" periods to maintain the temperature of 226° F. in the sensor plate 12 and would further result in a higher percent input needed to maintain the high boil in the large amount of liquid.

If desired, the projections 100 may be formed integral with the sensor plate 12 or, as shown in FIGS. 3 and 4, a one-piece sensor plate 12' may be provided having a continuous outwardly extending flange 102 in the same location as the projections 100. In place of the projection 100 mentioned above, other methods of picking up heat from the heating element 2 and transferring it to the sensor plate 12 may be used. A modification that may successfully be employed is shown in FIG. 6 which comprises a wire of high thermal conductivity material 104 wound in a plurality of turns around the outer sides of the sensor plate 12 so as to pick up heat from the heating element 2, or, as shown in FIG. 5, the outer surfaces of sensor plate 12 may be purposely darkened by any suitable means, such as etching or dyeing, so as to produce a "black body" area 106 around the sensor plate 12.

It is further emphasized that the method of boil control herein described is not limited to the particular type of control as disclosed, but may be used in any automatic cooking system wherein a thermal sensing device, that is in contact with the vessel bottom, is used.

The heat pickup means also presents the advantage of a safety control in the event that the cooking vessel 8 is removed and the housewife neglects to turn the unit off. In such a case the unit would not "run away" and cause continuous input to the heating element 2, for the radiant and convected heat to the heat pickup means from the heating element 2 would be sufficient to induce a control temperature in the sensor plate 12 and cause the bimetal 14 to cycle at some temperature in moderate excess of a normal temperature incurred at the same dial setting with a vessel 8 placed on the heating element 2. Further, although the term heating element 2 is used it is to be realized that standard heating elements may include a plurality of heated coils. Also, for range purposes the heating elements are circular and accordingly the sensor plate 12 and projection 100 are shown so as to be cooperable with a circular heating element 2. However, as is well known, other configurations of heating elements may be employed, and the sensor plate 12 and projections 100 modified in accordance therewith.

It is further to be realized that the various previously described pickup means will also be effective in regions below the boiling point. Such heat pickup will cause earlier cycling of the bimetal 14 in a manner similar to that of the heater coil 36. Accordingly, it can readily be seen that it is only necessary to properly calibrate the entire control device, primarily by adjusting the contact pressure between the contacts 20—22, to obtain the desired cycling at temperatures below the boiling point.

Having described preferred embodiments of my invention in accordance with the patent statutes, it is desired that the invention be not limited to the specific constructions shown, inasmuch as it is apparent that modifications thereof may be made without departing from the broad spirit and scope of my invention. Accordingly, it is desired that the invention be interpreted as broadly as possible, and that it be limited only as required by the prior art.

I claim as my invention:

1. A control device for controlling the heat input to a cooking vessel and its contents by means of controlling an electrical resistance heating unit having a central opening through which said control device extends comprising, a sensor plate of a heat conducting material located at the cooking surface side of said unit, a bimetallic member thermally secured to said sensor plate, a pair of contacts one of which is mechanically connected to said bimetallic member to be movable into and out of engagement with the other in response to movement of said bimetallic member, electrical circuit means electrically connected to each of said contacts for controlling the electrical energization of an electrical resistance unit, a short skirt on said sensor plate extending through the central opening in said heating unit and terminating adjacent the opposite surface of said unit, and auxiliary high thermal conductivity means on the outer side of said sensor plate skirt so as to be located closely adjacent said controlled electrical resistance unit for additionally heating said sensor plate to cause movement of said bimetallic member.

2. A control device for controlling the heat input to a cooking vessel and its contents by means of controlling an electrical resistance heating unit having a central opening through which said control device extends comprising, a thermal control device having a high heat conducting sensor plate located at the cooking surface side of said unit, said device also having a control portion which is movable in response to temperature changes of said sensor plate, electrical circuit means connected to said control portion for controlling the electrical energization of said electrical resistance unit in response to movement of said control portion, a short skirt on said sensor plate extending through the central opening in said heating unit and terminating adjacent the opposite surface of said unit, and auxiliary high thermal conductivity means thermally secured to the outer side of said skirt so as to be located more closely adjacent said controlled resistance unit for additionally heating said conducting portion to cause movement of said control portion.

3. A control device for controlling the heat input to a cooking vessel and its contents by means of controlling an electrical resistance heating unit having a central opening through which said control device extends comprising, a thermal control device having a high heat conducting sensor plate located at the cooking surface side of said unit, said device also having a control portion which is movable in response to temperature changes of said sensor plate, electrical circuit means connected to said control portion for controlling the electrical energization of an electrical resistance unit in response to movement of said control portion, a short skirt on said sensor plate extending through the central opening in said heating unit and terminating adjacent the opposite surface of said unit, and auxiliary high thermal conductivity means thermally secured to the outer side of said skirt comprising an outwardly extending flange at the inner end of said skirt of a high thermal conductivity which is adapted to be located closely adjacent said controlled resistance unit for additionally heating said conducting portion to cause movement of said control portion.

4. A control device for controlling the heat input to a cooking vessel and its contents by means of controlling an electrical resistance heating unit having a central opening through which said control device extends comprising, a thermal control device having a high heat conducting sensor plate, said device also having a control portion which is movable in response to temperature changes of said sensor plate, electrical circuit means connected to said control portion for controlling the electrical energization of an electrical resistance unit in response to movement of said control portion, a short skirt on said sensor plate extending through the central opening in said heating unit and terminating adjacent the opposite surface of said unit, and auxiliary high thermal conductivity means thermally secured to the outer side of said skirt comprising a plurality of turns of high thermal conductivity wire thereon to be located closely adjacent said controlled resistance unit for additionally heating said conducting portion to cause movement of said control portion.

5. A control device for controlling the heat input to a cooking vessel and its contents by means of controlling an electrical resistance heating unit having a central opening through which said control device extends comprising, a thermal control device having a high heat conducting sensor plate, said device also have a control portion which is movable in response to temperature changes of said sensor plate, electrical circuit means connected to said control portion for controlling the electrical energization of an electrical resistance unit in response to movement of said control portion, a short skirt on said sensor plate extending through the central opening in said heating unit and terminating adjacent the opposite surface of said unit, and auxiliary high thermal conductivity means thermally secured to said skirt comprising a flange formed integral with the inner end thereof and extending outwardly therefrom so as to be located closely adjacent said controlled resistance unit for additionally heating said conducting portion to cause movement of said control portion.

6. In an electrically operated cooking apparatus, an electrical heating unit having a heating surface adapted to receive a cooking vessel, a thermal control device mounted in cooperative relation with said heating unit and having a thermally conducting portion engageable by a cooking vessel placed on said heating surface so as to receive heat by thermal conduction from said vessel, said control device including a thermal switch in the energizing circuit for said heating unit for controlling the heating unit in response to temperature changes of said conducting portion, an auxiliary heater for said thermal switch, manually operable means for selectively energizing said auxiliary heater at different levels to control the amount of heat contributed by said auxiliary heater to the thermal switch, and auxiliary high thermal conductivity means in said control device located closely adjacent at least a portion of said heating unit for additionally heating said thermal switch in accordance with the degree of energization of said heating unit.

7. In an electrically operated cooking apparatus, an electrical heating unit having a heating surface adapted to receive a cooking vessel, said heating unit being formed to provide a generally central opening in said surface, a thermal control device having a sensor plate located in said opening and engageable by a cooking vessel placed on said surface so as to receive heat by thermal conduction from said vessel, said control device including a thermal switch in the energizing circuit for said heating unit for controlling the heating unit in response to temperature changes of said conducting portion, an auxiliary heater for said thermal switch, manually operable means for selectively energizing said auxiliary heater at different levels to control the amount of heat contributed by said auxiliary heater to the thermal switch, and said sensor plate having auxiliary high thermal conductivity means located adjacent said heating unit for additionally heating said thermal switch in accordance with the degree of energization of said heating unit.

8. In an electrically operated cooking apparatus, an electrical heating unit having a heating surface adapted to receive a cooking vessel, said heating unit being formed to provide a generally central opening in said surface, a thermal control device having a sensor plate located in said opening and engageable by a cooking vessel placed on said surface so as to receive heat by thermal conduction from said vessel, said control device including a thermal switch in the energizing circuit for said heating unit for controlling the heating unit in response to temperature changes of said conducting portion, an auxiliary heater for said thermal switch, manually operable means for selectively energizing said auxiliary heater at different levels to control the amount of heat contributed by said auxiliary heater to the thermal switch, and said sensor plate having a side portion facing said heating unit at least a portion of which is blackened to increase the radiant heat absorption thereof for additionally heating said thermal switch in accordance with the degree of energization of said heating unit.

9. In an electrically operated cooking apparatus, an electrical heating unit having a heating surface adapted to receive a cooking vessel, said heating unit being formed to provide a generally central opening in said surface, a thermal control device having a sensor plate located in said opening and engageable by a cooking vessel placed on said surface so as to receive heat by thermal conduction from said vessel, said control device including a thermal switch in the energizing circuit for said heating unit for controlling the heating unit in response to temperature changes of said conducting portion, an auxiliary heater for said thermal switch, manually operable means for selectively energizing said auxiliary heater at different levels to control the amount of heat contributed by said auxiliary heater to the thermal switch, and said sensor plate having a side portion located closely adjacent said heating unit with a plurality of coils of high thermal conductivity material wound therearound for additionally heating said thermal switch in accordance with the degree of energization of said heating unit.

10. In an electrically operated cooking apparatus, an electrical heating unit having a heating surface adapted to receive a cooking vessel, said heating unit being formed to provide a generally central opening in said surface, a thermal control device having a generally inverted cup-shaped sensor plate supported in said opening so that its upper surface is adapted to be engaged by a cooking vessel placed on said surface and over said opening, said control device including a thermal switch in the energizing circuit for said heating unit for controlling the heating unit in response to temperature changes of said conducting portion, an auxiliary heater for said thermal switch, manually operable means for selectively energizing said auxiliary heater at different levels to control the amount of heat contributed by said auxiliary heater to the thermal switch, and auxiliary high thermal conducting means thermally secured to the outer sides of said sensor plate in close proximity to at least the portion of said heating unit forming said opening to increase the heat transfer to said sensor plate from said heating unit for additionally heating said thermal switch in accordance with the degree of energization of said heating unit.

References Cited in the file of this patent

UNITED STATES PATENTS

| | | |
|---|---|---|
| 2,207,634 | Myers | July 9, 1940 |
| 2,427,945 | Clark | Sept. 23, 1947 |
| 2,524,506 | Akeley | Oct. 3, 1950 |
| 2,606,990 | Akeley | Aug. 12, 1952 |
| 2,678,379 | Fry | May 11, 1954 |
| 2,686,250 | Schroeder | Aug. 10, 1954 |
| 2,826,072 | Kliever | Mar. 11, 1958 |